F. W. REES.
MIRROR ATTACHMENT FOR VEHICLES.
APPLICATION FILED FEB. 25, 1920.
1,426,010.  Patented Aug. 15, 1922.
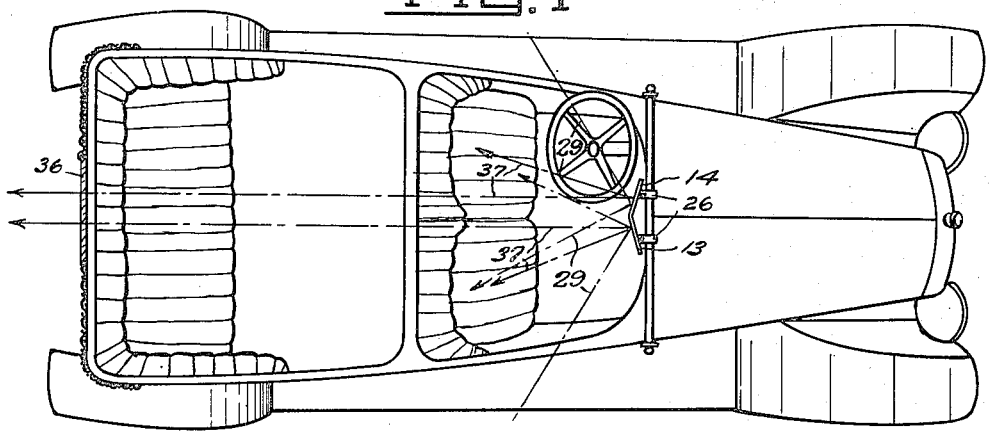
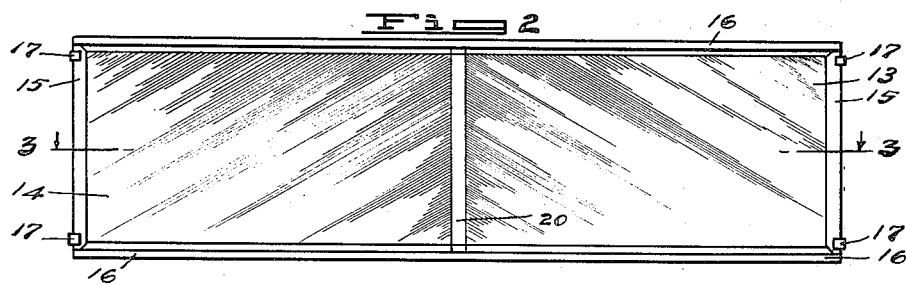
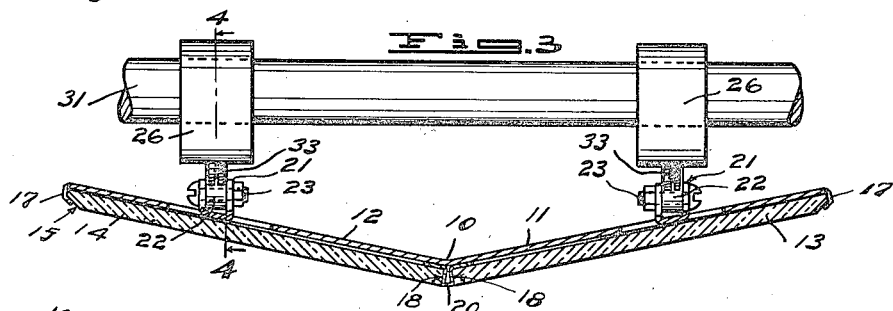
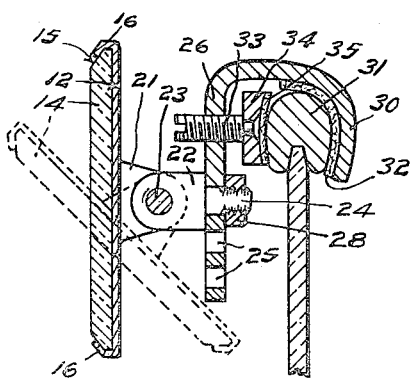
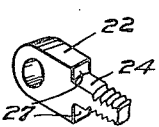
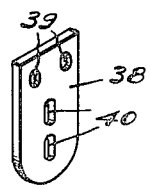
INVENTOR
Frank W. Rees
BY ATTORNEY
Fred C. Matheny

UNITED STATES PATENT OFFICE.

FRANK W. REES, OF SEATTLE, WASHINGTON, ASSIGNOR TO SEE-ALL MANUFACTURING CO., OF SEATTLE, WASHINGTON, A CORPORATION.

MIRROR ATTACHMENT FOR VEHICLES.

1,426,010. Specification of Letters Patent. Patented Aug. 15, 1922.

Application filed February 25, 1920. Serial No. 361,291.

*To all whom it may concern:*

Be it known that I, FRANK W. REES, a citizen of the United States, residing at Seattle, in the county of King and State of Washington, have invented certain new and useful Improvements in Mirror Attachments for Vehicles, of which the following is a specification.

My invention relates to improvements in reflectors or mirrors, of the type that are adapted to be secured to the windshields or frame of motor vehicles to enable persons within the vehicle to see a reflected image of objects in the rear of the vehicle, and the object of my improvement is to provide a mirror of this class that will enable both of the occupants of the front seat of the motor vehicle to see an image of objects that are behind the vehicle.

Another object of this improvement is to provide a mirror of this nature that is neat in appearance, strong and durable in construction and one that is not expensive to manufacture.

A further object is to provide strong and rigid but easily adjustable means for securing this mirror to the windshield or to the front frame portions of a motor vehicle.

The invention consists in the novel construction, adaptation and combination of parts of a duplicate mirror for motor vehicles as will be more clearly hereinafter described and claimed.

In the accompanying drawings, Figure 1 is a somewhat diagrammatic plan view showing the application of my mirror to a motor vehicle; Fig. 2 is a view in front elevation of the mirror; Fig. 3 is a sectional view, substantially on a broken line 3, 3 of Fig. 2; Fig. 4 is a view in cross section on broken line 4, 4 of Fig. 3, a fragment of an automobile windshield being shown. Fig. 5 is a detached view in perspective of a detail of the invention, and Fig. 6 is a detached view in perspective of an auxiliary form of device for securing the mirror to the front end of a motor vehicle.

Like reference numerals designate like parts throughout the several views.

Referring to the drawings, I have shown a relatively long, rectangular frame, preferably formed of sheet metal that is bent as at 10 midway between its two ends in such a manner that the two end sections 11 and 12 of such frame lie in planes that are inclined with respect to each other as more clearly shown in Fig. 3.

Secured within the end sections 11 and 12 of the frame are plate glass mirrors 13 and 14 respectively that are preferably each beveled on one end and two side edges as at 15 and that have the side edges of the frame securely clinched or bent thereover as at 16. In constructing and assembling, it has been found more convenient to provide two separate lugs 17 on each end of the frame for clinching over the edge of the mirrors 13 and 14 rather than to clinch or bend the entire end of the frame over the end of the glass.

The inner ends of the mirrors 13 and 14 are preferably cut squarely off as at 18 and the open space that would otherwise be left between such two ends is filled by a thin strip of metal 20 bent as shown in Fig. 3 and having its exposed front side nickel plated or otherwise nicely and ornamentally finished.

If desired the two mirrors 13 and 14 may be made of a single piece of glass bent in its central portion to fit the frame but owing to the fact that plate glass bent in this way is not easy to obtain, I have found it more practical to use two separate pieces as shown.

In practice I have found that the angle between the reflecting surfaces of the two mirrors should be between one hundred ninety five and two hundred ten degrees and that the most satisfactory angle for motor vehicles now in common use is about two hundred degrees.

When the frame is made a pair of lugs 21 are stamped out and bent rearwardly from each side 11 and 12 of such frame, the two lugs of each pair being spaced a short distance apart for the reception of the end of a flat plate 22 which is pivotally secured to the lugs by a small bolt 23. The outer end of the plate 22 is provided with an integral stud 24 that is adapted to project through a slot 25 in a hook shaped hanger 26, the plate 22 having shoulders 27 that engage with the outer side of the hanger 26 and being rigidly secured to such hanger by a nut 28. The stud 24 is flat on its two sides as shown in Fig. 5, so that when it is inserted in the elongated holes or slots 25 the hanger 26 will be prevented from turning thereon. Several of the slots 25 are provided, one above another, so that the position of the mirror with respect to the hanger may be adjusted.

The shorter side 30 of the hanger 26 is adapted to hook over the top bar 31 of a windshield and is preferably lined with a piece of soft material 32 to prevent marring of the windshield bar 31. Threaded through the longer side of the hanger 26 near the top of such hanger is a screw 33 that has a plate 34 pivotally secured to its inner end which plate has a covering 35 of soft material to prevent marring of the bar 31 when it is forced against the same by turning the screw 33.

When the mirror is to be secured to a windshield the nuts on the bolts 23 may be loosened and the mirror tilted forwardly into the position shown by dotted lines in Fig. 4, thus making it possible to use a screw driver on the screws 33.

After the hangers 26 are hooked over the top bar of the windshield and securely clamped thereto, the mirror frame may be tilted upwardly into its correct position, adjusted to suit the occupants of the front seats of the vehicle on which it is used and securely clamped in the adjusted position by tightening the nuts on the bolts 23.

When this mirror is applied to an automobile, as shown in Fig. 1, it will preferably be adjusted so that the reflected image of objects in rear of the car may be seen by persons in the front seats through the transparent plate 36 in the back curtain of the car top, as indicated by the lines 37.

When the mirror is adjusted into this position it will be found that the occupant on the left hand front seat of the vehicle can see images of objects at the right hand side of the vehicle in the right hand mirror and that the occupant of the right hand front seat can see images of objects at the left hand side of the vehicle in the left hand mirror, all as indicated by dotted lines 29, in Fig. 1.

Having the two mirrors 13 and 14 fixed at a certain definite angle with respect to each other makes it possible to adjust the two at one operation so that both the driver and the other occupant of the front seat can see objects in rear of the car in which they are riding.

In Fig. 6 I have shown a bracket 38 that may be used instead of the hangers 26 for securing this mirror to an enclosed car where the windshield glass in the front of the car is set in a wooden frame, the bracket 37 being provided with holes 39 through which screws may be inserted to secure the same to a wooden frame and being further provided with slots 40 for the reception of the stud 24 on the end of the plates 22.

Another method of securing the mirror to the frame of a windshield that has no bar across the top is to make the stud 24 on the end of the plates 22 long enough to go through the frame of the windshield and be secured thereto as a bolt.

This mirror is neat and ornamental in appearance, is not expensive to manufacture, is easily applied to any ordinary car having a windshield or enclosed front portion and is especially useful in preventing accidents because it enables both occupants of the front seat to see the road behind the car.

From the foregoing description, taken in connection with the accompanying drawings, the advantages of the construction and of the method of operation of this device will be readily understood by those skilled in the art to which the invention relates, and, while I have described the principle of operation of the invention, together with the device, which I now consider to be the best embodiment thereof, it will be understood that the device shown is merely illustrative and that such changes may be made as are within the scope of the following claims:

What I claim is:

1. As an article of manufacture, a double rear sight mirror for motor vehicles comprising two plane reflectors arranged with their reflecting surfaces at an angle of substantially two hundred degrees with respect to each other, and adjustable means for securing said mirror to the windshield of a motor vehicle whereby an occupant of either side of the front seat of said vehicle may see images of objects to the rear of the vehicle in one reflector and images of objects at the other side of the vehicle in the other reflector.

2. As an article of manufacture a double rear sight mirror for motor vehicles comprising a sheet metal frame formed of two plane sections having their front sides disposed at an angle of more than 180° with respect to each other, means for securing said frame to the front windshield portion of a motor vehicle, a plane plate glass mirror disposed in each frame section the adjoining edges of said mirrors being squared off at substantially right angles to the plane of the mirrors, and a metallic strip having a flat face portion flush with the outermost edges of said mirrors and having convergent side portions disposed between the ends of said mirrors and terminating in outwardly projecting portions that are disposed between said frame and the rear surfaces of said mirrors.

Signed at Seattle, Washington, this 6th day of February 1920.

FRANK W. REES.